(12) United States Patent
Kubota et al.

(10) Patent No.: US 6,338,295 B1
(45) Date of Patent: Jan. 15, 2002

(54) FUEL PUMP

(75) Inventors: Kenichi Kubota, Morioka; Norio Takehana, Shizukuishi-machi; Noriaki Chiba, Morioka, all of (JP)

(73) Assignee: Mikuni Adec Corporation (JP)

( * ) Notice: Subject to any disclaimer, the term of this patent is extended or adjusted under 35 U.S.C. 154(b) by 0 days.

(21) Appl. No.: 09/429,958

(22) Filed: Oct. 29, 1999

(30) Foreign Application Priority Data

Mar. 30, 1999 (JP) .............................. 11-088054

(51) Int. Cl.$^7$ .............................. F16J 3/02; F04B 17/00
(52) U.S. Cl. ...................... 92/100; 417/413.1
(58) Field of Search .................... 92/98 R, 99, 100; 417/413.1

(56) References Cited

U.S. PATENT DOCUMENTS 4,086,036 A * 4/1978 Hagen et al. ................. 92/99
5,192,198 A * 3/1993 Gebauer et al. ............. 92/98 R

* cited by examiner

Primary Examiner—Edward K. Look
Assistant Examiner—Michael Leslie
(74) Attorney, Agent, or Firm—Lorusso & Loud

(57) ABSTRACT

A fuel pump which has excellent heat resistance and salt resistance, is low in cost and light in weight, and which is free from fuel leakage. The fuel pump has a bottom body formed of a thermosetting resin such as bakelite material which has heat resistance and strength, and a top body and a cover formed of a thermoplastic resin. The top body and the cover 16 are assembled with a seal member such as a gasket held between the top body and the cover, and the top body and the bottom body 12 are fixed together by a fixing element. Thereby, the main body portions of the fuel pump are constituted of resin.

3 Claims, 6 Drawing Sheets

Externally of the boat | Internally of the boat

FUEL PUMP

TECHNICAL FIELD OF THE INVENTION

The present invention relates to a fuel pump, and particularly to a fuel pump to be installed in a high temperature environment.

BACKGROUND OF THE INVENTION

With a small outboard motor, as shown in FIG. 4, a fuel tank 40 is arranged internally of the boat, and a fuel pump 42 is arranged externally of the boat. The fuel pump 42 is generally secured directly to a cylinder head cover 46 of an engine 44 in consideration of space and to be driven by power from the engine. Fuel from the fuel pump 42 is introduced into the engine 44 through a carburetor 48.

FIG. 5 shows a conventional fuel pump 42, and FIG. 6 is a sectional view taken on line A—A of FIG. 5. The fuel pump 42 comprises a bottom body portion 50 secured to the cylinder head cover 46, a top body portion 52 mounted thereon, and a cover 54. A piston 56 driven by the engine 44 is set so as to move with a reciprocating motion relative to the bottom body portion 50. A diaphragm assembly 60 having a diaphragm 58 is connected to the piston 56. The top body 52 is provided with a suction valve 62 and the discharge valve 64 which separate top and bottom sections of the top body portion 52, which sections communicate through the suction valve 62 and the discharge valve 64.

The fuel pump 42 is assembled by fixing the bottom body 50, the top body 52 and the cover 54 with the diaphragm 58 held between the bottom body 50 and the top body 52. A seal member 66, such as a gasket, is held between the top body portion 52 and the cover 54. For fixing the bottom body portion 50, the top body portion 52 and the cover 54 together in one step, the bottom body portion 50 is formed with a stepped thread insert hole 68, the top body 52 is formed with a thread insert hole 70, and the cover 54 is formed with an internal threaded hole 72. A bolt 74 is inserted into the threaded insert holes 68, 70 from the bottom body portion 50 side so that the bolt 74 is threadedly engaged with the internally threaded portion 72 of the cover 54. The external thread 74 is tightened to the internal thread portion 72 of the cover 54 whereby the bottom body 50, the top body 52 and the cover 54 are integrally fixed.

The diaphragm 58 is held between the bottom body portion 50 and the top body portion 52 whereby a pump chamber 76 is defined within the top body portion 52 adjacent the diaphragm 58. The seal member 66 is held between the top body 52 and the cover 54 and closes a suction chamber 78 and a discharge chamber 80 which are formed independent of each other within the top body portion 52 above the seal member 66. The suction chamber 78 communicates with the pump chamber 76 through the suction valve 62, and the discharge chamber 80 communicates with the pump chamber 76 through the discharge valve 64.

In the fuel pump 42, when the piston 56 and the diaphragm 58 are moved downward in FIG. 5, the discharge valve 64 is closed and the suction valve 62 is opened so that fuel is introduced into the pump chamber 76 from the suction chamber 78. Next, when the piston 56 and the diaphragm 58 move upward in FIG. 5, the suction valve 62 is closed and the discharge valve 64 is opened so that fuel is moved to the discharge chamber 80 from the pump chamber 76.

For sealing the bottom body portion 50 with the cylinder head cover 46, there is used a thermal setting resin such as a phenol resin (bakelite) which is light weight and heat resistant, and has a high strength. The top body portion 52 and the cover 54 are formed of metal, such as aluminum, by die casting. Aluminum is used for the cover 54 because, in order to provide a tight fit when tightening the diaphragm 58, the top body 52 and the seal member 66 by the external thread 74, the cover 54 with the internally threaded hole 72 is made of metal. Aluminum is used for the top body 52 in order to prevent compressed permanent strain due to the tightening of the bottom body 50 and the cover 54.

However, there has been the drawback that when the top body 52 and the cover 54 are formed of aluminum, a rust-proof treatment is necessary, which treatments increases the cost, and increases the weight.

Preferably, the top body 52 and the cover 54 are made of synthetic resin in consideration of economy and weight. However, when the cover 54 is made of synthetic resin, slack occurs in the threaded engagement by the bolt 74, resulting in a possibility of leakage of fuel. Further, when the top body portion 52 is made of synthetic resin, it is tightened between the bottom body 50 and the cover 54, resulting in a compressed permanent strain. Therefore, the top body 52 and the cover 54 could not be made of synthetic resin.

Further, as shown in FIG. 5, the bolt 74 is inserted through the diaphragm 58 and the seal member 66. Therefore, it has been necessary to increase the size of the diaphragm to extend to a location where the bolt 74 can be inserted through the diaphragm 58 and the seal member 66. Further, it is necessary for the diaphragm 58 and the seal member 66 to be formed with a hole (not shown) through which the bolt 74 is inserted, resulting in a possible breakage of the diaphragm 58 and the seal member 66 from formation of the hole.

The present invention has been made in view of the foregoing and has, as its object to provide a fuel pump which is excellent in heat resistance and salt resistance, which is low in cost and light in weight, and which is free from leakage of fuel.

SUMMARY OF THE INVENTION

For achieving the aforementioned object, according to the present invention, there is provided a fuel pump in which a diaphragm is held between a bottom body and a top body, and a seal member is held between the top body and a cover, wherein a thermosetting resin is used for the bottom body, a thermoplastic resin is used for the top body and the cover, with the seal member held between said top body and said cover, and said top body and said bottom body, with said diaphragm therebetween, are fixed together by a fixing means.

DETAILED DESCRIPTION OF THE PREFERRED EMBODIMENTS

The present invention will be explained hereinafter with reference to the drawings.

Figure 1:
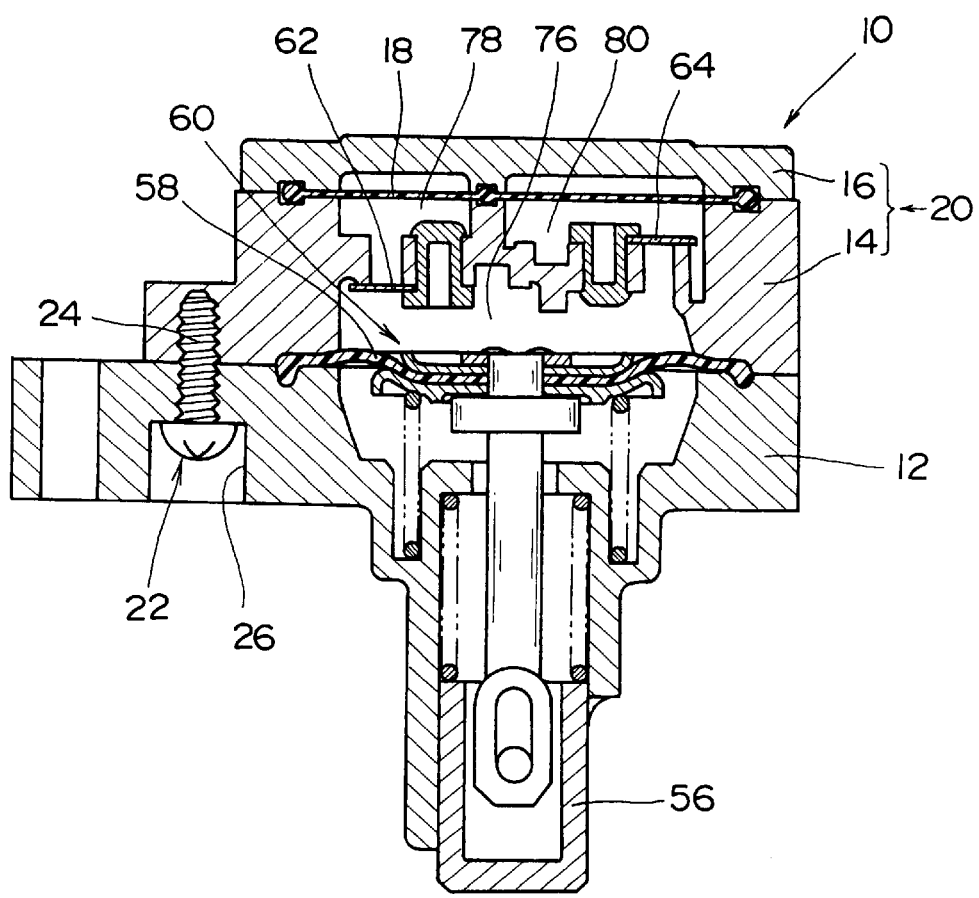
FIG. 1 is a sectional view showing an embodiment of a fuel pump according to the present invention.
Figure 5:
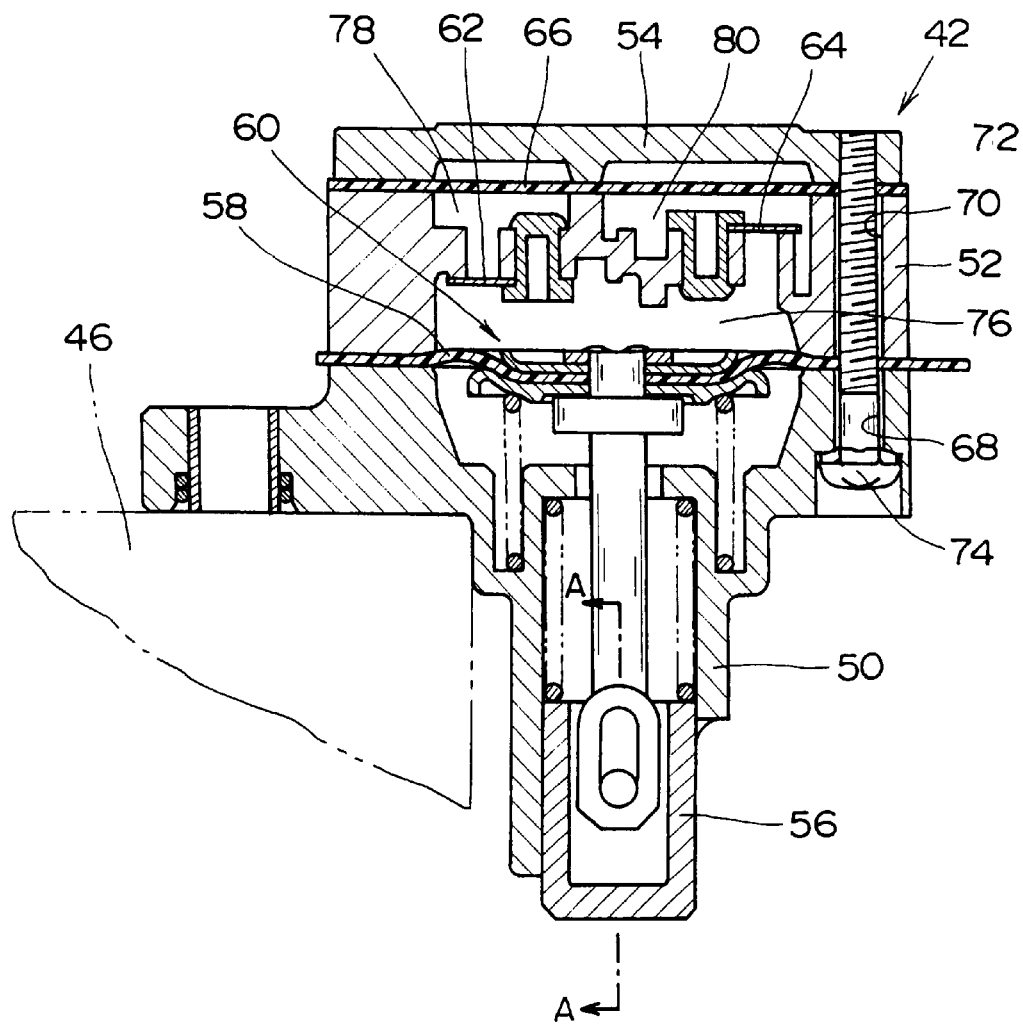
FIG. 5 is a sectional view of a conventional fuel pump.
Figure 6:
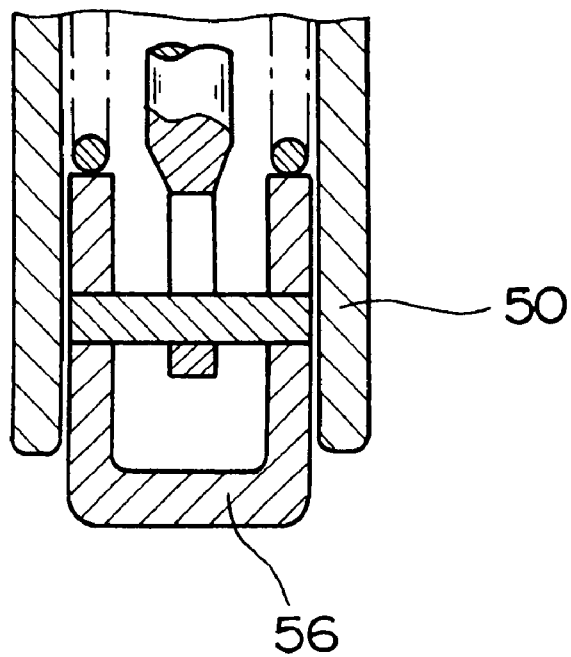
FIG. 6 is a sectional view taken on line A—A of FIG. 5.

FIG. 1 is a sectional view showing an embodiment of a fuel pump according to the present invention. In FIG. 1, the same reference numerals as those of FIG. 5 designate the same members. Further, the same constituent parts have the same function as that previously described.

In a fuel pump 10 according to the present invention, a bottom body 12 is a thermosetting resin such as a phenol resin (bakelite), which has a heat resistance and a high strength, similar to the prior art. On the other hand, a top body 14 and a cover 16, are formed of thermoplastic resins such as polyoxymethylene, polyamide, polyvinyl chloride resin, polyethylene, etc. For the top body 14 and the cover 16, preferably, the same materials are used, but if materials are thermoplastic resins that can be deposited each other, any resin can be used.

In the fuel pump according to the present invention, the top body 14 and the cover 16 are assembled with a seal member 18, such as a gasket, held therebetween. At that time, the outside diameter of the top body 14 and the outside diameter of the cover 16 are made larger than that of the seal member 18 whereby the top body 14 and the cover 16 can be deposited in a state that the seal member 18 is held between the top body 14 and the cover 16. The thus deposited top body 14 and cover 16 constitute an upper assembly 20. The upper assembly 20 houses the seal member 18, a suction valve 62, a discharge valve 64, a suction chamber 78 and a discharge chamber 80. Since the top body 14 and the cover 16 are deposited with the seal member 18 held therebetween, the seal member 18 can be made small without a bolt 74 extending therethrough.

The top body 14 of the upper assembly 20 adjoins the bottom body 12, and a diaphragm 58 is held therebetween and the upper member 20 and the bottom body 12 are fixed together by a fixing element 22. The upper assembly 20 and the bottom body 12 are fixed with the diaphragm 58 held therebetween whereby a pump chamber 76 is formed between the diaphragm 58 and the upper member 20.

As the fixing element 22, a tapping screw 24, for example, as shown in FIG. 1, is used. A countersunk hole 26 is formed in the bottom body 12 at a point where the tapping screw 24 is received. The countersunk hole 26 has a relatively small diameter near the upper assembly 20, and a relatively large diameter furthest from the upper assembly 20. The hole 26 extends to a point such that when the tapping screw 24 is screwed into the upper assembly 20 side from the bottom body 12 side, the head of the tapping screw 24 is not exposed. The position of the countersunk hole 26 is provided externally of the outer periphery of the diaphragm 58. Thus, the fixing element 22 is not inserted through the diaphragm 58. Thereby, the diaphragm 58 can be made small, and in addition, a hole for receiving a bolt 74 need not be formed in the diaphragm 58, reducing the possibility of damage to the diaphragm.

The tapping screw 24 advances while tapping an internal thread in the upper member 20 formed of a thermoplastic resin. Therefore, in a state that tightening is completed, no clearance is present between the tapping screw 24 and the upper member 20 so that the lowering of a tightening torque is relatively small, and a stable fixing state can be maintained.

Figure 2:
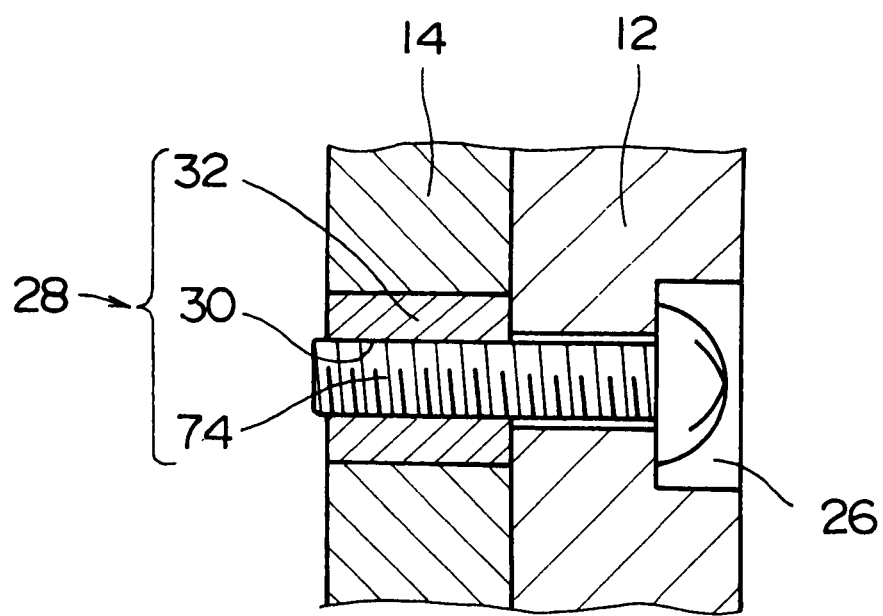
FIG. 2 is a sectional view showing another fixing means for fixing an upper assembly to a bottom body.

FIG. 2 shows another embodiment of a fixing element 28 for fixing the upper assembly 20 and the bottom body 12 together. A metal collar 32 formed with internal threads 30 is fixed within the upper assembly 20 by means of a known means such as press fitting. A bolt 74 is inserted from the countersunk hole 26, and the bolt 74 is threadedly engaged with the internal threads 30 of the metal collar 32 whereby the bottom body 12 and the upper assembly 20 are fixed together. The fixing element 28 shown in FIG. 2 comprises the metal collar 32 fixed within the upper assembly member 20 and the bolt 74 threadedly engaged with the internal threads 30.

Figure 3:
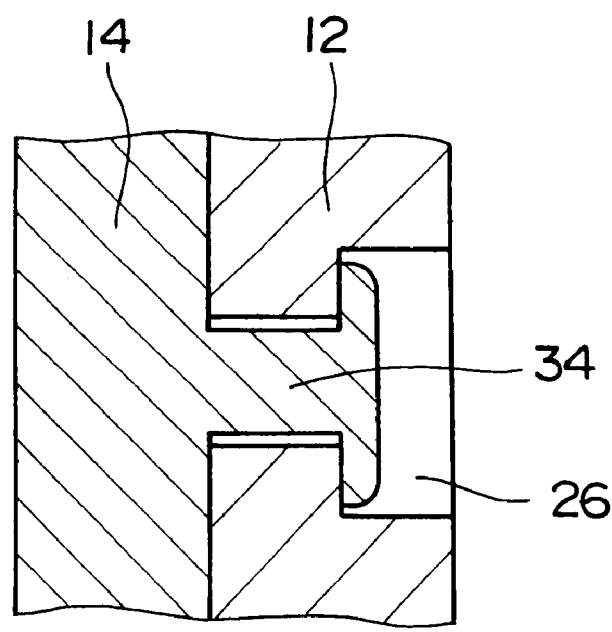
FIG. 3 is a sectional view showing another fixing means for fixing the upper assembly to the bottom body.
Figure 4:
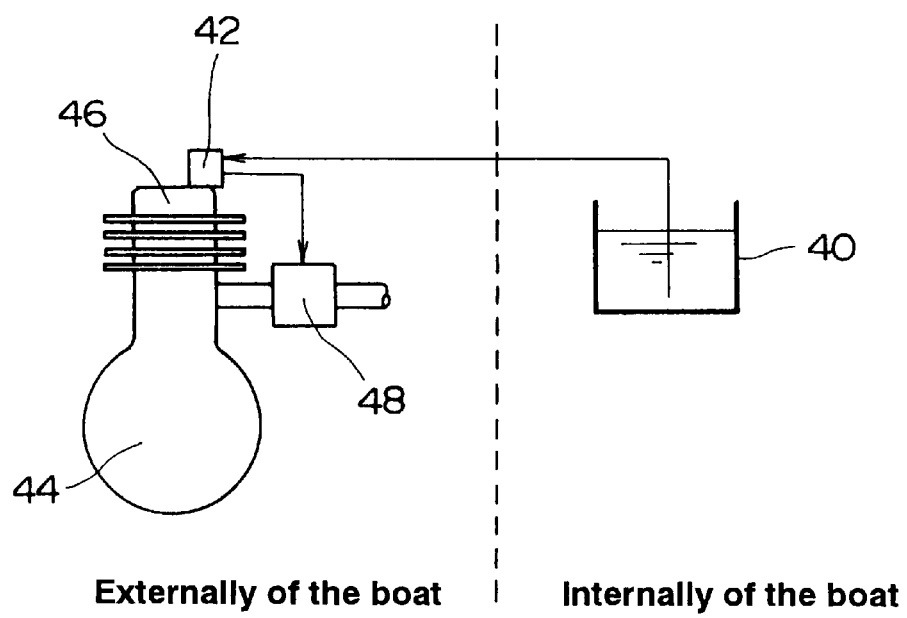
FIG. 4 is a schematic view showing arrangement of a fuel tank, a fuel pump, and an engine.

FIG. 3 shows another fixing element for fixing the upper assembly 20 and the bottom body 12. The bottom body 12 is formed with the countersunk hole 26. The upper member 20 is formed with a projection 34 as a fixing element which extends through the countersunk hole 26 and is to form a head which is relatively large in diameter within the hole 26 (caulked). The caulking is preferably a thermal caulking. Thereby, the bottom body 12 and the upper assembly 20 are fixed together.

While different embodiments of fixing elements are shown as 22, 28 and 34 in FIGS. 1, 2 and 3, it is noted that the fixing element is not limited thereto.

As described above, in the fuel pump according to the present invention, since the top body and the cover are formed of synthetic resin, the rust-proof treatment is not necessary, the cost can be reduced considerably, and the weight can be reduced, as compared with the prior art fuel pump in which the top body and the cover are manufactured by die casting.

Further, since the fixing element is not inserted through the diaphragm, the diaphragm can be made small, and the possibility of damage is lessened.

What is claimed is:

1. A fuel pump comprising:

a housing comprising a bottom body portion, a top body portion superimposed on said bottom body portion and a cover superimposed on said top body portion, said top body portion having at least one open chamber;

a fixing element, extending through said bottom body portion and terminating within said top body portion, for securing said top body portion to said bottom body portion;

a diaphragm held between said bottom body portion and said top body portion, said diaphragm having a diameter sufficiently small that said fixing element does not extend through said diaphragm; and a seal member held between said top body portion and said cover, said seal member covering and closing said at least one open chamber; and wherein said bottom body portion is formed of a thermosetting resin and said top body portion and said cover are formed of a thermoplastic resin.

2. A fuel pump according to claim 1 wherein said bottom body portion and said top body portion are fixed together by thermal caulking said fixing element.

3. A fuel pump according to claim 1 wherein said fixing element is a bolt which is engaged within a threaded hole within said top body portion.

* * * * *